(12) United States Patent
Yamada et al.

(10) Patent No.: US 6,249,735 B1
(45) Date of Patent: Jun. 19, 2001

(54) VEHICLE STATE ESTIMATION METHOD AND VEHICULAR AUXILIARY BRAKE CONTROL APPARATUS USING THE METHOD

(75) Inventors: Naoki Yamada; Toshiaki Ishiguro, both of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/236,438

(22) Filed: Jan. 25, 1999

(30) Foreign Application Priority Data

Jan. 28, 1998 (JP) .................................. 10-015963
Jan. 30, 1998 (JP) .................................. 10-019054

(51) Int. Cl.[7] ...................................... G06F 7/00
(52) U.S. Cl. ............................. 701/65; 701/70
(58) Field of Search .................. 701/1, 64, 65, 701/70, 93, 94

(56) References Cited

U.S. PATENT DOCUMENTS 4,548,079 * 10/1985 Klatt ........................................ 701/65
5,925,087 * 7/1999 Ohnishi et al. ......................... 701/70

FOREIGN PATENT DOCUMENTS 60-222330   11/1985   (JP) .
2-278069    11/1990   (JP) .
09002225     1/1997   (JP) .

* cited by examiner

Primary Examiner—William A. Cuchlinski, Jr.
Assistant Examiner—Edward Pipala
(74) Attorney, Agent, or Firm—Sughrue, Mion, Zinn, Macpeak & Seas, PLLC

(57) ABSTRACT

A vehicle weight and a road surface gradient are estimated based on driving torque values and vehicle acceleration values when specific behavior occurs in a vehicle. Resulting estimation values are used for vehicle controls such as an engine control, an auxiliary brake control, and a transmission control.

7 Claims, 7 Drawing Sheets

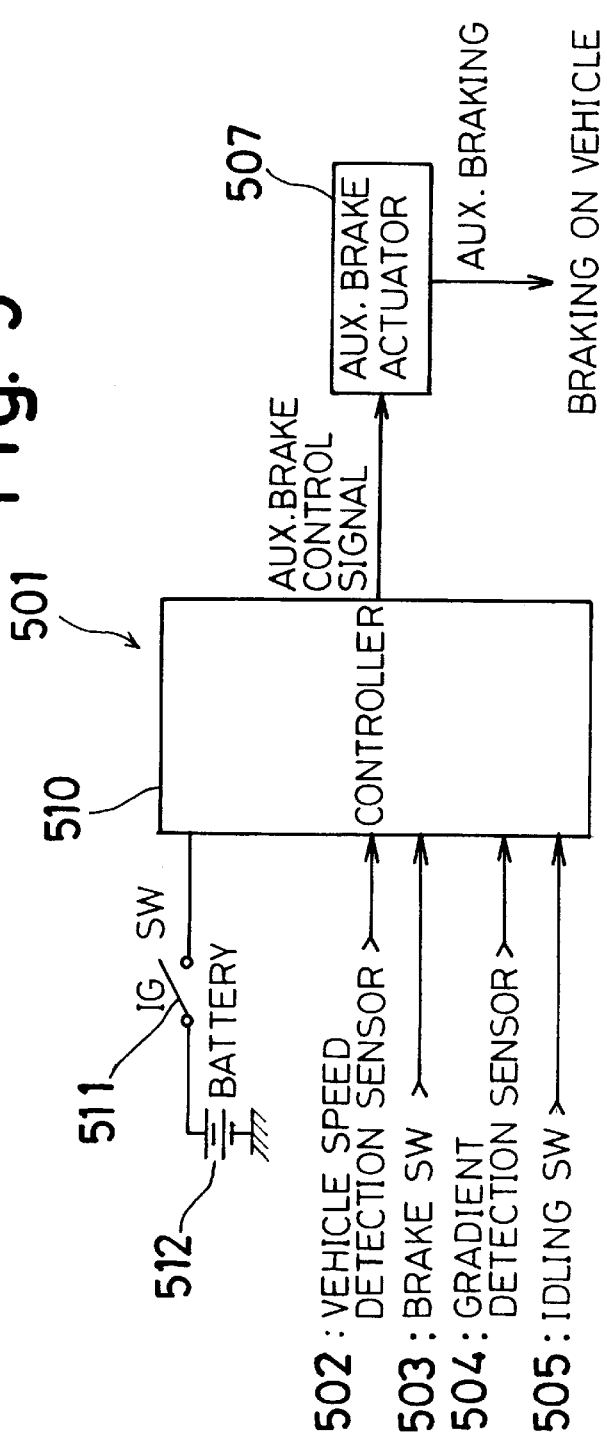
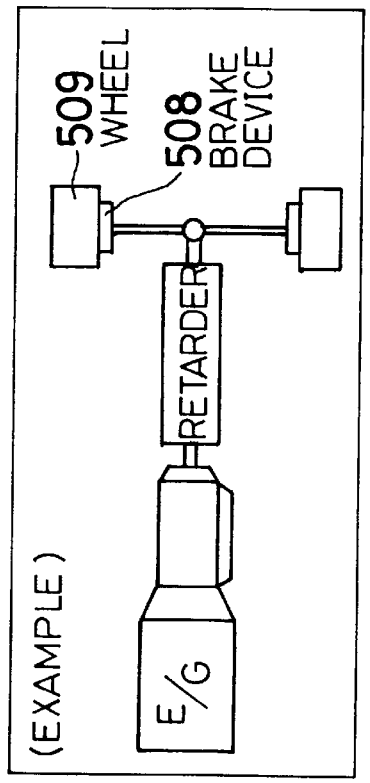

VEHICLE STATE ESTIMATION METHOD AND VEHICULAR AUXILIARY BRAKE CONTROL APPARATUS USING THE METHOD

BACKGROUND OF THE INVENTION

1. Field of the Invention

The present invention relates to a vehicle state estimation method and a vehicular auxiliary brake control apparatus which uses the estimation method. In particular, the invention relates to a method for estimating the vehicle state of a commercial vehicle capable of carrying loads or passengers such as a truck or a bus and to a vehicular auxiliary brake control apparatus using that estimation method.

2. Description of the Related Art

In commercial vehicles, the load amount greatly varies from an empty state to a loaded state even though the engine is small for the vehicle's own weight. When such a commercial vehicle is heavily loaded with goods, passengers, or the like and its weight (total weight) is increased accordingly, sufficient braking performance is not attained on a downhill slope or the like because the engine braking becomes less effective. This necessitates control of the driving force or the braking force in consideration of the vehicle weight (total weight)

Conventionally, in estimating the vehicle state, a comprehensive parameter of a vehicle load as represented by vehicle load torque Tl that is the sum of aerodynamic drag torque Ta, rolling resistance torque Tr, and surface gradient resistance torque Tθ is estimated based on the relationship between the driving torque and the acceleration by using a vehicle weight sensor, a torque sensor, or the like. However, this method causes an estimation error when the road surface has a gradient as in the case of running on a sloping road. Further, in this method, the vehicle weight and the road surface gradient cannot be separated properly from the vehicle load torque.

In general, in automobiles, the road surface gradient can be estimated relatively easily with an assumption that the vehicle weight is constant, because no large variation occurs in vehicle weight. On the other hand, in vehicles such as commercial ones in which the vehicle weight varies greatly, it cannot be judged whether a vehicle load variation is due to a variation in road gradient or a variation in vehicle weight. This necessitates estimation of the road surface gradient, and hence the estimation method for automobiles cannot be used for commercial vehicles.

SUMMARY OF THE INVENTION

The present invention has been made in view of the above problems in the art and an object of the invention is therefore to make it possible to estimate the road surface gradient accurately even when the vehicle weight varies by separating the vehicle weight and the road surface gradient from the vehicle load.

Another object of the invention is to provide a vehicular auxiliary brake control apparatus by using the above estimation method.

To attain the above objects, according to the invention, the vehicle weight and the road surface gradient are estimated based on driving torque and vehicle acceleration when behavior occurs in a vehicle.

In the above method, since the vehicle weight and the road surface gradient are estimated based on driving torque and vehicle acceleration, the vehicle weight and the road surface gradient can be determined if driving torque and vehicle acceleration are determined.

If behavior at a time of a gear shift in the vehicle is employed as the above-mentioned behavior, the vehicle weight and the road surface gradient can be estimated based on driving torque values and vehicle acceleration values before and after the gear shift.

If the estimation is performed at a time of a shift from the low to the second gear, the estimation can be performed when a large variation in driving torque occurs, whereby the estimation errors can be reduced.

If the driving torque is determined by using a torque map, a torque sensor is no longer necessary because the driving torque can be determined by using an engine torque map, a torque converter torque map, or the like.

The invention makes it possible to estimate the vehicle weight and the road surface gradient based on driving torque and vehicle acceleration and to optimize the control of driving force or braking force by using the estimated vehicle weight and road surface gradient. For example, in the case of an auxiliary braking device, a braking operation is performed by employing, as a target vehicle speed, a vehicle speed at a time point when road surface gradient detecting means has detected a downhill slope and brake state detecting means has detected a change from a brake operating state to a brake non-operating state during running downhill.

In this manner, the invention provides an auxiliary brake control apparatus which can decelerate a vehicle properly and sufficiently so as to reflect the driver's intention by controlling an auxiliary brake so that an actual vehicle speed becomes a target vehicle speed that is a vehicle speed obtained when a change from a brake operating state to a brake non-operating state occurs during running downhill.

It is preferable that an accelerator state detecting means for detecting the state of an accelerator be further provided, and that the auxiliary brake device be activated when the accelerator state detecting means has detected a non-operating state of the accelerator. This enables braking in a state that the driver is not pushing the accelerator (i.e., no acceleration request is made).

According to another aspect of the invention, road surface gradient detecting means for detecting a road surface gradient, brake state detecting means for detecting an operation state of a brake, and vehicle speed detecting means for detecting a speed of the vehicle are used, and a vehicle speed at a time point when the road surface gradient detecting means has detected a downhill slope and the brake state detecting means has detected a change from a brake operating state to a brake non-operating state during running downhill is employed as a target vehicle speed, and an auxiliary brake control is performed by operating an auxiliary brake device for decelerating the vehicle so that an actual vehicle speed becomes the target vehicle speed.

In this method, by controlling the auxiliary brake so that the actual vehicle speed becomes the target vehicle speed that is a vehicle speed obtained when a change from a brake operating state to a brake non-operating state occurs during running downhill, a proper auxiliary brake operation becomes possible that reflects the driver's intention. As a result, the driver need not perform cumbersome manipulations any more.

If the auxiliary brake apparatus is activated when the brake state detecting means has detected that a brake non-operating state has been established after a brake operating state continued for a predetermined time, the auxiliary brake device can operate so as to realize a speed that satisfies the driver's deceleration request more properly.

BRIEF DESCRIPTION OF THE DRAWINGS

FIG. 9 is a block diagram showing a system configuration of a vehicular auxiliary brake control apparatus according to a second embodiment of the invention.

DETAILED DESCRIPTION OF THE PREFERRED EMBODIMENTS

Embodiments of the present invention will be hereinafter described with reference to the accompanying drawings.

Figure 1:
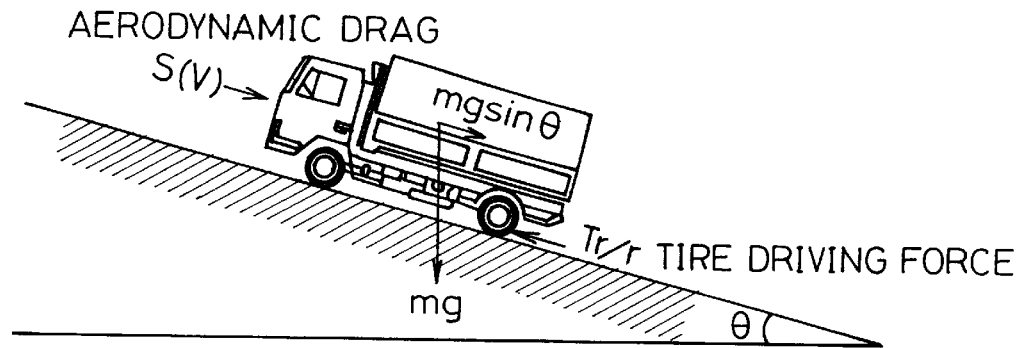
FIG. 1 shows dynamics in a state where a commercial vehicle is climbing a slope, for description of a first embodiment of the present invention.

FIG. 1 shows dynamics in a state where a vehicle is climbing a slope. With a notation that the road surface gradient of a sloping load is represented by θ, the weight of a commercial vehicle is represented by m, and the gravitational acceleration is represented by g, the force component along the slope is given by mgsin θ. Further, the acceleration α along the slope is given by the following equation of motion:

$$m\alpha = T_r/r - mg\sin\theta - S(V)$$

where Tr is tire torque, r is a tire radius, and S(V) is a vehicle-speed-dependent function (second-order function) including aerodynamic drag torque Ta and rolling resistance torque Tr. The driving torque T (in this case, the tire torque Tr) can be determined either by using a sensor or by estimation. For example, the driving torque T may be determined based on an output of a torque sensor that is attached to a propeller shaft, or based on a characteristic map such as an engine torque map or a torque converter torque map without using a sensor. As for the vehicle weight estimation, a calculation for estimating a vehicle weight and a road surface gradient is performed by using the above equation when behavior occurs in the vehicle, that is, a shift is made from the low to the second gear in a transmission 8. Specifically, this is done in the following manner. A vehicle acceleration value α1 before a gear shift and a vehicle acceleration value α2 after it are given by $$\alpha 1 = T1/rm - g\sin\theta - S(V1)/m \qquad (1)$$

$$\alpha 2 = T2/rm - g\sin\theta - S(V2)/m \qquad (2)$$

where T1 is a driving torque value before the gear shift, T2 is a driving torque value after the gear shift, V1 is a vehicle speed or a wheel speed before the gear shift, and V2 is a vehicle speed or a wheel speed after the gear shift.

If V1 is approximately equal to V2, the vehicle weight m can be determined as $$m = (T1 - T2)/(\alpha 1 - \alpha 2)r. \qquad (3)$$

The road surface gradient θ can be determined as follows by substituting the vehicle weight m into Equation (1):

$$\sin\theta = (T1/rm - S(V1)/m - \alpha 1)/g \approx \theta. \qquad (4)$$

In the above calculation, when a variation in vehicle acceleration is small, the accuracy of the denominator in Equation (3) would be low to cause a large estimation error. By performing the above estimation in a low-to-second gear shift where a variation in vehicle acceleration is large because of a large variation in driving torque, the vehicle weight m and the road surface gradient θ can be estimated accurately.

Figure 2:
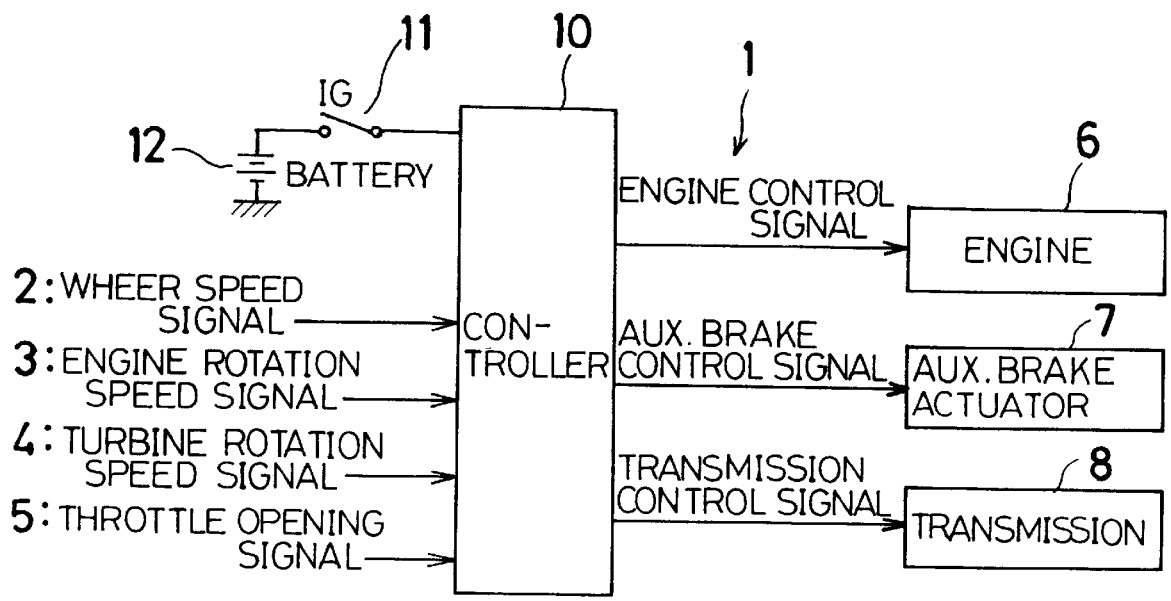
FIG. 2 is a block diagram showing a system configuration of a vehicle control apparatus according to the first embodiment.

FIG. 2 shows a configuration of a vehicle control apparatus 1 using the above method. As shown in FIG. 2, power is supplied from a battery 12 to a controller 10 when an ignition (IG) switch 11 is turned on, whereupon the controller 10 is rendered operational. The controller 10 may either be added to various control devices for controlling an auxiliary brake, an engine, and a transmission of the vehicle, or be provided separately therefrom.

The controller 10 receives a wheel speed signal 2 coming from a wheel speed sensor that is attached to a wheel, an engine rotation speed signal 3, a turbine rotation speed signal 4 of a transmission 8, and a throttle opening signal 5. Estimating the vehicle weight and the road surface gradient internally based on those signals, the controller 10 controls the vehicle in accordance with its states by outputting an auxiliary brake control signal to an auxiliary brake actuator 7, a transmission control signal to the transmission 8, and an engine control signal to an engine 6. An example of this vehicle control is an auxiliary brake control, which can be applied to a retarder, for example. The engine braking is less effective in commercial vehicles that are equipped with an automatic transmission. The retarder is provided to compensate for the engine braking. The retarder is classified into a generator type, a type utilizing loss of fluid. Conventionally, a manual control is conducted in which the driver manipulates the switch for operating the retarder in accordance with the gradient of a downhill slope. In contrast, by causing the retarder to automatically operate in accordance with the road surface gradient, the number of braking operations can be reduced. Furthermore, by reducing the load on the driver, this measure improves the safety of driving.

The above vehicle control can also be applied to the transmission control. That is, on a downhill slope or the like, the transmission control is performed in association with a lock-up clutch control, whereby the vehicle speed can be decreased by engine braking that is stronger than in the case of issuing a shift-down request.

Still further, the above vehicle control can be applied to the engine control, in which case the engine braking can be made more effective by cutting the fuel supply. In addition, in a commercial vehicle such as a truck, the driving force or the braking force can be controlled under proper conditions, that is, based on correct estimation values of the vehicle weight and the road surface gradient, by making the engine braking more effective by controlling an exhaust brake.

Figure 3:
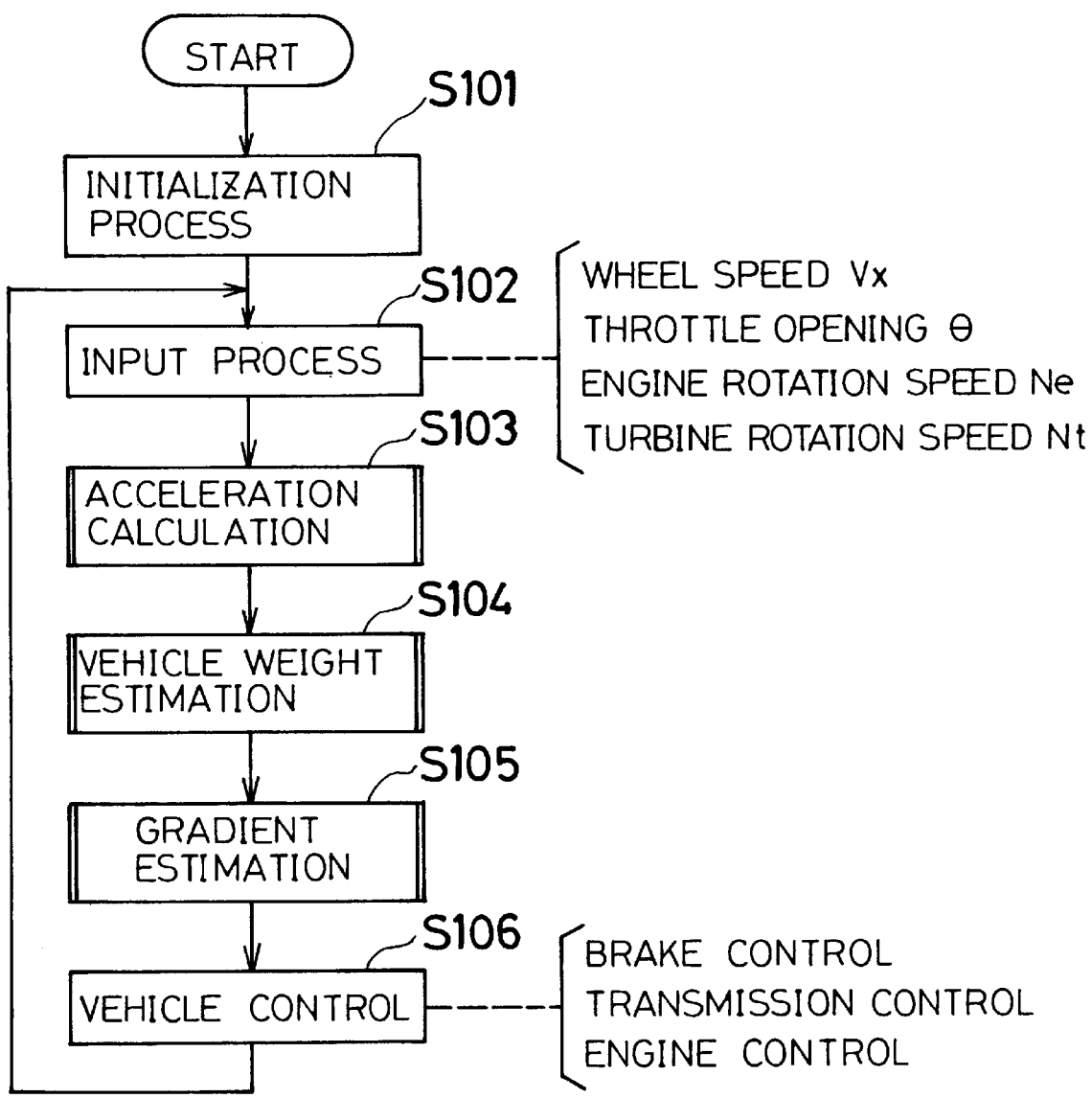
FIG. 3 is a flowchart showing a process to be executed by a controller according to the first embodiment.

Next, a process to be executed by the controller 10 will be described with reference to a flowchart of FIG. 3. Upon application of power to the controller 10, an initialization process is executed at step S101. In the initialization process, memories inside the controller 10 are checked, initial values are set in necessary memories, and it is checked whether the controller 10 operates normally. At the next step S102, an input process is executed. That is, a wheel speed VX, a throttle opening θ, an engine rotation speed Ne, a turbine rotation speed Nt of the transmission 8, etc. are input to the controller 10 via I/O ports and stored in the necessary memories inside the controller 10. Although in this example the wheel speed is input as vehicle speed information, a vehicle speed signal coming from the transmission 8 may be input instead.

An acceleration calculation is performed at step S103.

Figure 5:
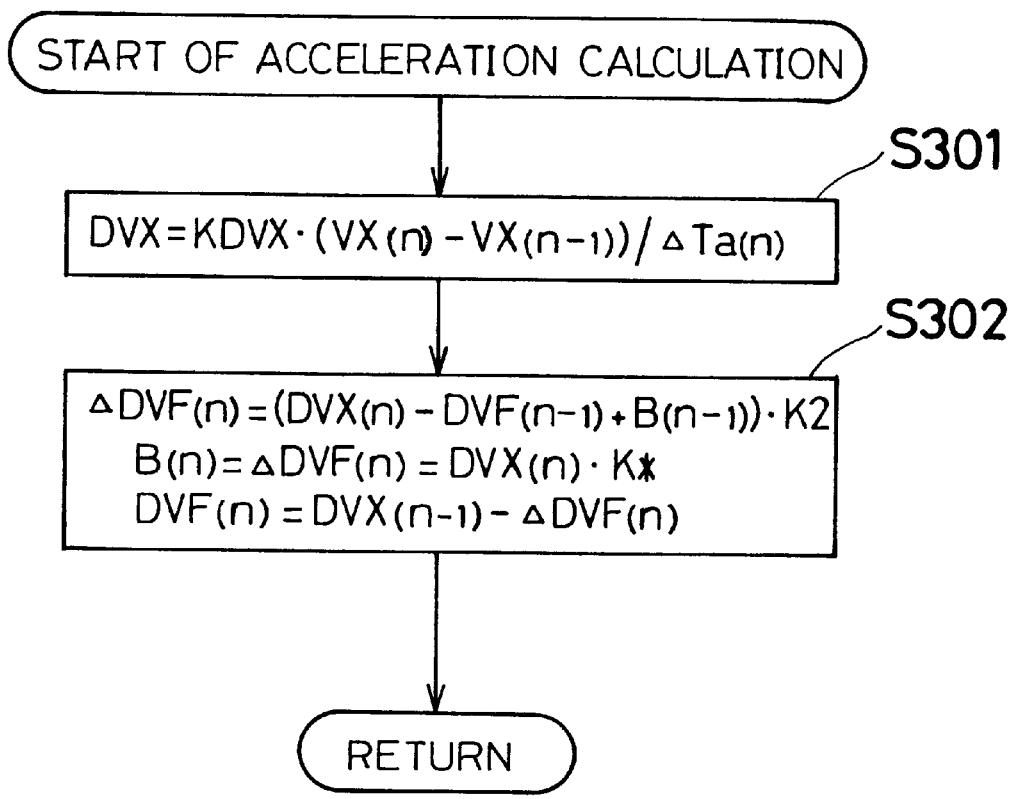
FIG. 5 is a flowchart showing an acceleration calculation step in the process of FIG. 3.

In the acceleration calculation, an acceleration output DVX is determined according to an equation shown in step S301 of FIG. 5, where VX(n) is a current wheel speed value, VX(n−1) is a preceding wheel speed value, ΔTa(n) is a calculation time internal, and KDVX is a constant. Then, the calculated acceleration output DVX is caused to pass through an acceleration filter for eliminating noise etc. (step S302). In the acceleration filter, a current acceleration filter output DVF(n) is determined as follows:

$$\Delta DVF(n)=(DVX(n)-DVF(n-1)+B(N-1))K2 \quad (5)$$

$$B(n)=\Delta DVF(n)=DVX(n)K^* \quad (6)$$

$$DVF(n)=DVX(n-1)-\Delta DVF(n) \quad (7)$$

where DVX(n) is a current acceleration calculation output, Δ DVF(n) is a variation of the acceleration filter, DVF(n−1) is a previous acceleration filter output, B(n) is a current temporary value, B(n−1) is a preceding temporary value, and K* and K2 are constants.

At the next steps S104 and S105, vehicle weight estimation and gradient estimation are performed respectively based on the vehicle speed information and the driving torque. At step S106, a vehicle control is performed based on the estimated vehicle weight and gradient. Then, the process returns to step S102 to repeat steps S102–S106.

In the vehicle control at step S106, vehicle controls such as control of a retarder and an exhaust brake in accordance with the vehicle weight and the road surface gradient, a shift control on the transmission 8, and a throttle opening control can be performed under proper conditions.

Figure 4:
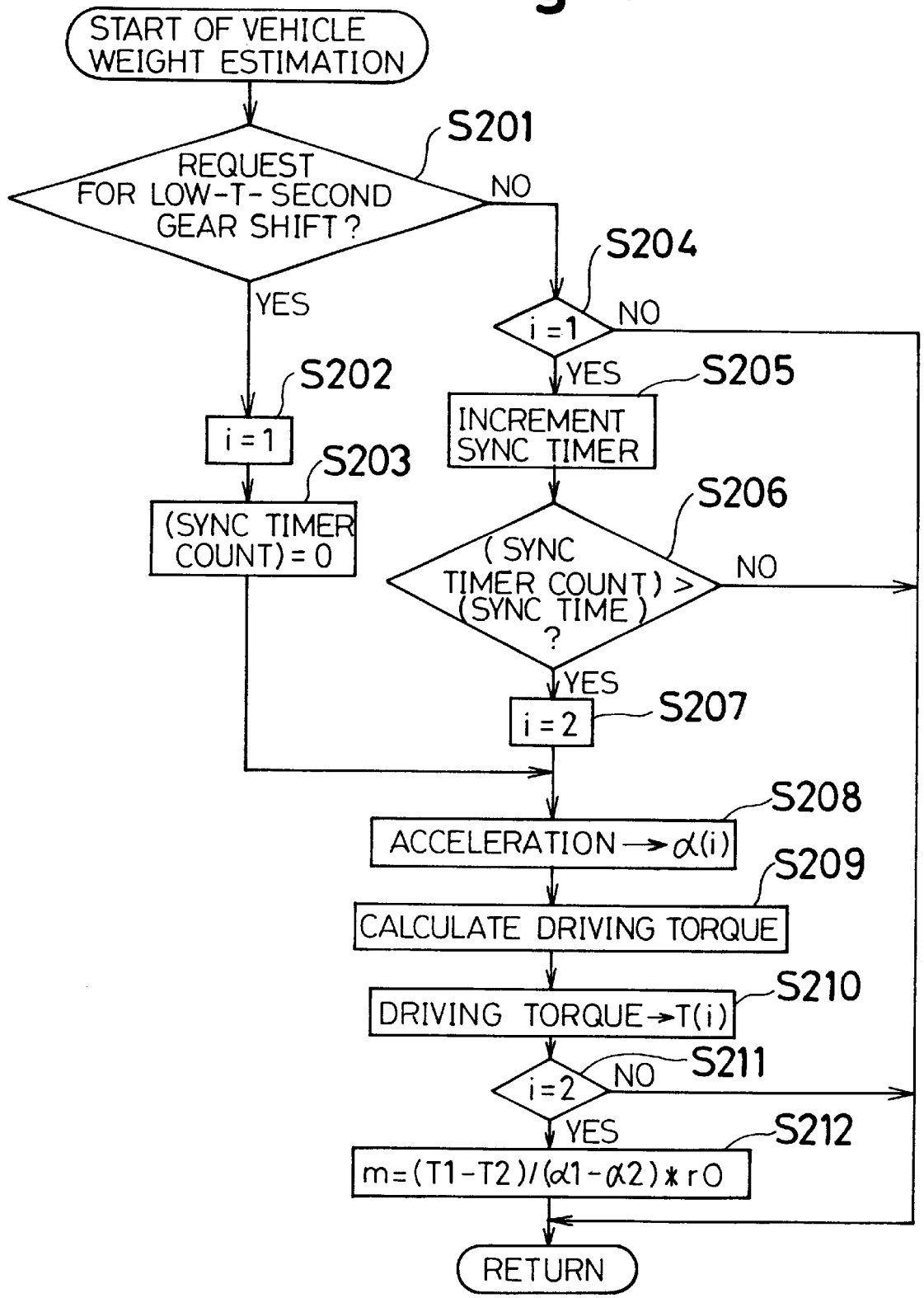
FIG. 4 is a flowchart showing a vehicle weight estimation step in the process of FIG. 3.

Next, the vehicle weight estimation according to the invention will be described with reference to FIG. 4. At step S201, it is judged whether a shift-up request (from the low to the second gear) has been output from a transmission controller that controls the transmission 8. If the judgment result is affirmative, the process goes to step S202, where a value "1" is substituted into pointer i. At step S203, a sync timer for counting until a time necessary to complete a shift to the second gear is elapsed (i.e., a time necessary for a change from a transitional state to a stable state after a gear shift) is cleared. Then, the process goes to step S208. On the other hand, if the judgment result at step S201 is negative (i.e., no low-to-second-gear shift-up request has been output), the process goes to step S204, where the state of pointer i is judged. If "1" is not substituted into pointer i, the process concerned is finished. If "1" is substituted into pointer i, the process goes to step S205, where the sync timer is incremented. Then, it is judged at step S206 whether the count of the sync timer indicates that the time (sync time) that is taken to complete a shift to the second gear and establish a stable state has elapsed. If the judgment result is negative, the process concerned is finished. If the judgment result is affirmative (i.e., the synchronization has been completed to establish a stable state), the process goes to step S207, where a value "2" is substituted into pointer i.

At the next step S208, an acceleration value is stored in a memory location indicated by pointer i. That is, an acceleration value α1 before the gear shift and an acceleration value α2 after the gear shift are stored in respective memory locations designated by pointer i.

Figure 7:
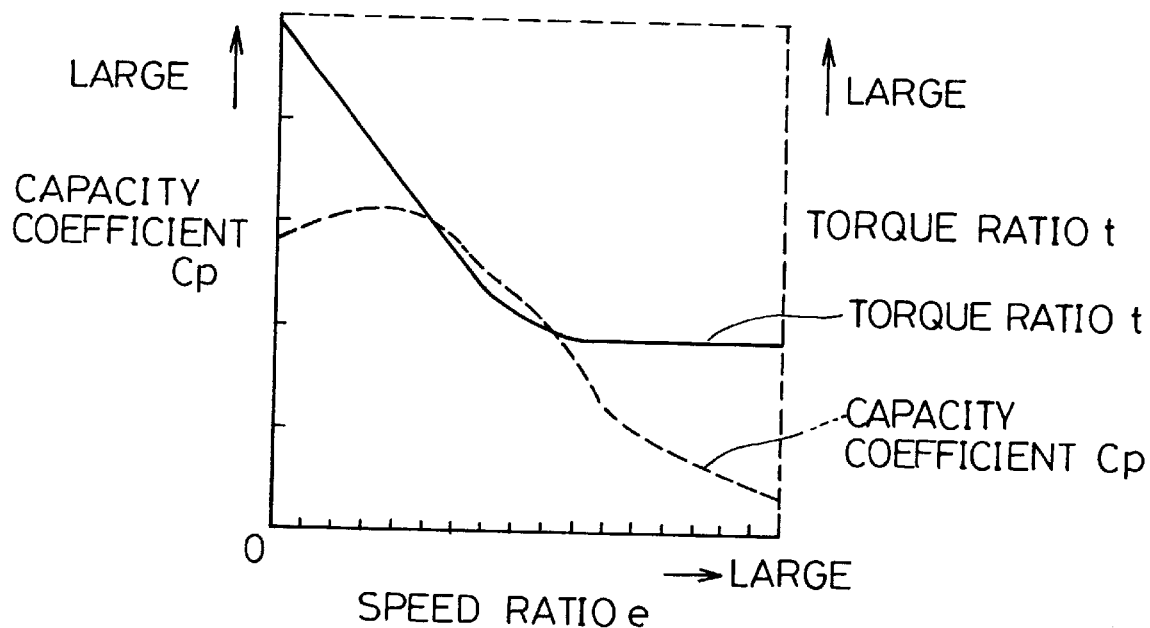
FIG. 7 is a graph showing relationships between the speed ratio e and the capacity coefficient Cp and between the speed ratio e and the torque ratio t that are used in the vehicle state estimation method according to the first embodiment.
Figure 8:
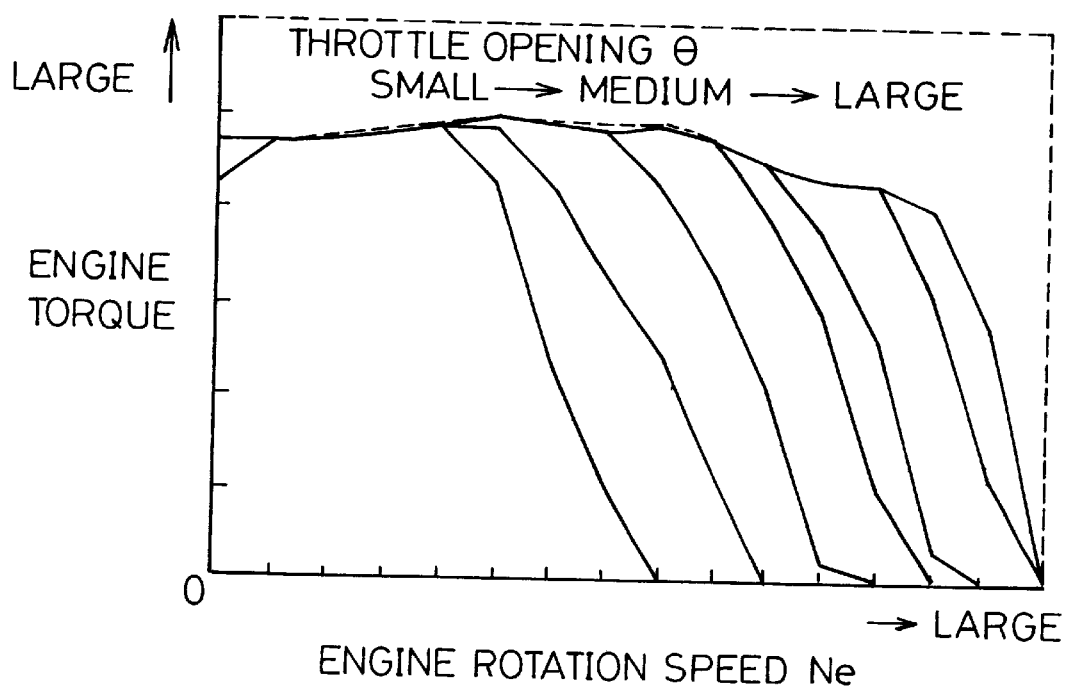
FIG. 8 is a graph showing an engine torque characteristic using the throttle opening θ as a parameter that is used in the vehicle state estimation method according to the first embodiment.

A driving torque calculation is performed at step S209. Although driving torque may be calculated based on an output of a torque sensor, in this embodiment it is calculated in the following manner. A speed ratio e (=Nt/Ne) of a torque converter is determined based on the turbine rotation speed Nt and the engine rotation speed Ne. By using the speed ratio e, a capacity coefficient Cp is determined according to an input capacity coefficient map (see FIG. 7). By using the capacity coefficient Cp and the engine rotation speed Ne, pump torque Tp is determined according to an equation Tp=Cp·Ne². Further, a torque ratio t is determined based on the torque ratio t according to a map of FIG. 7, and a turbine torque Tt is determined by multiplying the pump torque Tp by the torque ratio t. Then, driving torque (propeller torque) TO of the transmission 8 is determined by multiplying the turbine torque Tt by a predetermined gear ratio Gr. Tire torque Tr is determined by multiplying the driving torque TO by a differential ratio D. Alternatively, the driving torque TO may be determined by multiplying, by the torque ratio t, an engine torque having the throttle opening θ as a parameter (see FIG. 8).

Then, a driving torque value T1 before acceleration and a driving torque value T2 after it are stored in respective memory locations by storing the driving torque T in a memory location indicated by pointer i at step S210 in the same manner as in the case of the acceleration. At step S211, it is judged whether the value of pointer i is equal to "2." If it is not equal to "2," the process concerned is finished. If "2" is substituted into pointer i, at step S212 a vehicle weight m is estimated according to an equation shown in step S212 of FIG. 4 based on the stored vehicle acceleration values and driving torque values. That is, a vehicle weight m can be estimated based on an acceleration value and a driving torque value before a shift to the second gear and these values after the shift.

Figure 6:
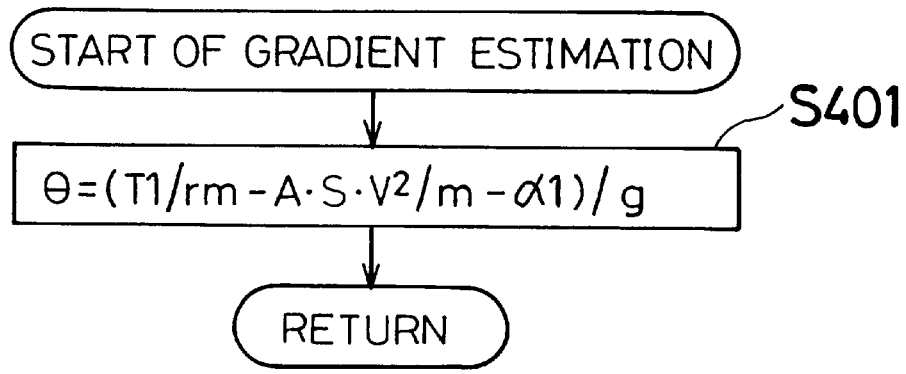
FIG. 6 is a flowchart showing a gradient estimation step in the process of FIG. 3.

FIG. 6 shows a process of road surface gradient estimation. Once the vehicle weight m is determined, a road surface gradient θ can be estimated according to an equation shown in step S401 of FIG. 6 (see Equation (4)) through substitution of the vehicle weight m that has been estimated above.

As described above, once the vehicle acceleration and the driving torque are determined, the vehicle weight m and the road surface gradient θ can be estimated and the engine control, the auxiliary brake control and the transmission control can be performed properly based on estimation values of the vehicle weight m and the road surface gradient θ.

Where estimation values of the vehicle weight m and the road surface gradient θ are used for the above vehicle controls, the vehicle weight m and the road surface gradient θ may be estimated at times other than when a shift is made from the low to the second gear as long as a variation in throttle opening is large, for example, at times of a shift from the second to the third gear, a shift from the third to the fourth gear, or the like.

The controls can be performed in accordance with correct vehicle states if the estimations are performed in such a manner that estimation values are cleared when a predetermined time has elapsed after turning-off of the engine in a state that the gear is at the parking range, with a judgment that e load has just been put on or removed from the vehicle, or when an estimation value deviates from the previous one by 50% or mere.

To further increase the estimation accuracy, it is proper to refrain from performing the vehicle weight estimation when the throttle opening θ is as small as 10% or less or the acceleration is too large for the throttle opening θ, with a judgment that a slip has occurred with the tires. A variation in road surface gradient is small in the road surface gradient estimation because the road surface gradient is calculated by using the relationship between the driving torque and the vehicle acceleration after the vehicle weight has been estimated. Therefore, it is proper to use a low-pass filter of 0.1 Hz for the averaging process.

Next, an embodiment in which the above vehicle state estimation method is applied to a vehicular auxiliary brake control apparatus will be described with reference to FIGS. 9 and 10. FIG. 9 shows the configuration of a vehicular auxiliary brake control apparatus 501. In particular, the apparatus 501 is applied to a vehicle having an auxiliary braking function that assists a main brake such as a disc brake or a drum brake. As shown in FIG. 9, power is supplied to a controller 510 from a battery 512 when an ignition (IG) switch 511 is turned on, whereupon the controller 510 is rendered operational. The controller 510 may either be added to a control device (an anti-skid control device, an engine control device, or the like) that is usually provided in a vehicle to decelerate it, or be provided separately therefrom.

The controller 510 receives a signal coming from a vehicle speed detection sensor 502 for detecting a vehicle speed, a signal coming from a brake switch (brake SW) that is attached to a brake pedal and whose state changes from a brake non-operating state (off state) to a brake operating state (on state) when the brake pedal is pushed, a signal coming from a gradient detection sensor 504 for detecting a road surface gradient, and a signal coming from an idling switch (idling SW) 505 that is attached to an accelerator pedal for accelerating the vehicle and that is rendered in an on-state when the accelerator pedal is not operated. Based on those signals, the controller 510 outputs an auxiliary brake control signal to an auxiliary brake actuator 507 to thereby decelerate the vehicle through operation of the auxiliary brake actuator 507. FIG. 9 shows an example in which the auxiliary brake actuator 507 (auxiliary brake device) is a retarder and the controller 510 outputs an auxiliary brake control signal to the retarder to thereby decelerate the vehicle through operation of the retarder. However, the invention is not limited to such a case. Another example is such that an auxiliary brake control signal is supplied to an exhaust brake bulb or the like of an exhaust brake and the vehicle is thereby decelerated.

The gradient detection sensor 504 is not limited at all as long as it detects a road surface gradient θ. Examples are an inclination sensor that detects a road surface gradient, a wheel speed sensor that is used in estimating a road surface gradient, an acceleration sensor and a torque sensor. The auxiliary brake actuator 507 is not limited at all as long as it brakes a vehicle. Examples are a retarder and an exhaust brake that are generally employed in large vehicles etc., a throttle for decreasing an engine output and a transmission.

In commercial vehicles, the vehicle inertia increases with an increase in vehicle weight due to loading or the like and hence an auxiliary brake such as a retarder or an exhaust brake is employed to secure sufficient braking force during braking. Conventionally, a manual control is conducted in which the driver manipulates an auxiliary brake manipulation switch for operating the auxiliary brake in accordance with the state of a downhill slope. In contrast, where the invention is applied to, for example, a retarder, by causing the retarder to automatically operate properly in accordance with a correctly judged road surface condition (such as a downward slope), frequent manipulations of the auxiliary brake manipulation lever that are performed conventionally on mountain roads etc. can be eliminated. As a result, the load on the driver is reduced, the driving is made safer and the vehicle is decelerated properly and sufficiently.

Next, a process to be executed by the controller 510 that controls the auxiliary brake actuator 507 of the auxiliary brake control apparatus 501 will be described with reference to a flowchart of FIG. 10.

Upon application of power to the controller 510, an initialization process is executed at step S601. In the initialization process, memories inside the controller 510 are checked, initial values are set in memories necessary for the control, and it is checked whether the system operates normally.

At step S602, it is judged whether the ignition switch 511 is turned on. If the judgment result is negative, the process concerned is finished. If the judgment result is affirmative (i.e., the ignition switch 511 is turned on), the process goes to step S603, where an auxiliary brake flag FB for indicating whether the auxiliary brake is being controlled and memories relating to the auxiliary brake control are cleared. At the next step S604, an input process is executed. That is, a signal coming from the vehicle speed detection sensor 502, a signal indicating the state of the brake switch 503, a signal coming from the gradient detection sensor 504, and a signal coming from the idling switch 505 are input to the controller 510 and stored in the necessary memories inside the controller 510. Although in this example a vehicle speed signal generated based on a rotation speed in the transmission is input as vehicle speed information, a vehicle speed signal coming from a wheel speed sensor that is attached to a wheel may be input instead.

Then, at step S605, gradient detection is performed by using the gradient detection sensor 504. This may be done in such a manner that a road surface gradient θ is detected based on an output of an inclination sensor or the like that varies linearly with respect to the gradient angle or that a road surface gradient θ is estimated based on a signal that is used for controlling the transmission, the engine, or the like by using a characteristic map of the engine or the torque converter.

Figure 10:
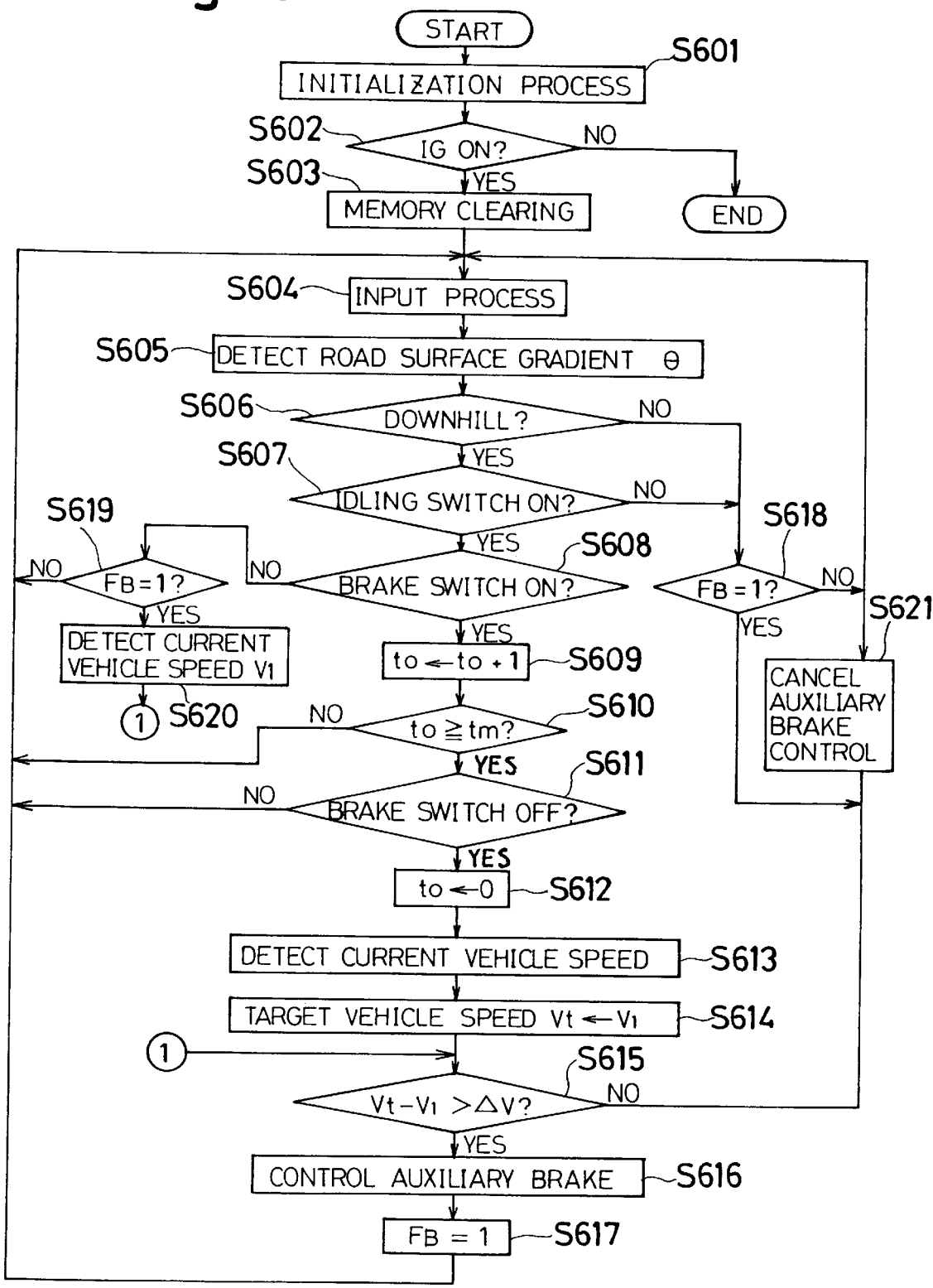
FIG. 10 is a flowchart showing a process to be executed by the vehicular auxiliary brake control apparatus of FIG. 9.

Returning to the flowchart of FIG. 10, once the road surface gradient θ has been determined, it is judged at step S606 whether the road surface on which the vehicle is running is a downhill slope (θ<0 in a case where the gradient of an uphill slope is defined as being positive). If the current road surface is not a downhill slope, the process goes to step S618. If it is a downhill, the process goes to step S607, where it is judged based on the state of the idling switch 505 whether the accelerator pedal is being pushed. If the accelerator pedal is being pushed (i.e., the idling switch 505 is in an off-state), the process goes to step S618, where it is judged whether the auxiliary brake flag FB for indicating whether the auxiliary brake is being controlled is set (i.e., it has a value "1"). If the auxiliary brake flag FB is not set (i.e., it has a value "0"), the process returns to step S604. If the auxiliary brake flag FB is set, the process goes to step S621.

On the other hand, if it is judged at step S607 that the accelerator pedal is not being pushed (i.e.,. the idling switch 505 is in an on-state), then at step S608 it is judged based on the state of the brake switch 503 whether the brake pedal is being pushed. If it is judged that the brake pedal is not being pushed (i.e., the brake switch 503 is in an off-state), the process goes to step S619, where the state of an auxiliary brake flag FB is judged. If it is judged at step S619 that the auxiliary brake flag FB is not set, the process returns to step S604. If the auxiliary brake flag FB is set, the process goes to step S620, where a current vehicle speed Vi is detected and stored in a predetermined memory. The process then goes to step S615.

If it is judged at step S608 that the brake pedal is being pushed (i.e., the brake switch 503 is in an on-state), the process goes to step S609, where a braking time counter t0 for counting from the start of braking is incremented every period. At the next step S610, it is judged whether the time of the braking time counter t0 has reached a predetermined time tm (several seconds), that is, whether the predetermined time tm has elapsed from the start of the braking manipulation. If the judgment result is negative, the process returns to step S604. If the judgment result is affirmative (i.e., the predetermined time tm has elapsed), the process goes to step S612, where the braking time counter t0 is cleared with a judgment that the braking manipulation has continued for a certain time. Then, at step S613, a current vehicle speed V1 is detected and stored in a predetermined memory. At the next step S614, a vehicle speed V1 at a time point when the manipulation of the brake pedal has been canceled after the braking manipulation continued for the predetermined time tm (i.e., the driver has decreased the vehicle speed to an intended speed) is stored in a memory as a target vehicle speed Vt.

At step S615, a deviation between the target vehicle speed Vt and the current vehicle speed V1 is calculated and compared with a preset speed $\Delta V$ (several kilometers per hour). If the speed deviation is larger than the preset speed $\Delta V$, the process goes to step S616, where an auxiliary brake control signal for activating the auxiliary brake is output to the auxiliary brake actuator 507 to activate the auxiliary brake actuator 507 and thereby decelerate the vehicle. At step S617, the auxiliary brake flag FB for indicating whether the auxiliary brake is being controlled is set. Then, the process returns to step S604 to repeat step S604 and the following steps.

On the other hand, if it is judged at step S615 that the speed deviation Vt−V1 is smaller than or equal to the preset speed $\Delta V$, at step S621 the controller 510 stops outputting the auxiliary brake control signal and thereby cancels the auxiliary brake control, with a judgment that it is not necessary to continue the vehicle decelerating operation any longer. Then, the process returns to step S604 to repeat step S604 and the following steps.

While the preferred embodiments have been described, variations thereto will occur to those skilled in the art within the scope of the present inventive concepts which are delineated by the following claims.

What is claimed is:

1. A vehicle state estimation method comprising the step of estimating a vehicle weight based on driving torque and vehicle acceleration during a gear shift in a vehicle and estimating a road surface gradient based on the vehicle weight.

2. The vehicle state estimation method according to claim 1, wherein the gear shift is a shift from a low gear to a second gear.

3. The vehicle state estimation method according to claim 1, further comprising the step of determining the driving torque by using a torque map.

4. A vehicular auxiliary brake control apparatus comprising:

road surface gradient detecting means for estimating a vehicle weight based on driving torque and vehicle acceleration when specific behavior occurs in a vehicle, and for detecting a road surface gradient based on the estimated vehicle weight;

brake state detecting means for detecting an operation state of the brake;

vehicle speed detecting means for detecting a speed of the vehicle; and an auxiliary brake device for employing, as a target vehicle speed, a vehicle speed at a time point when the road surface gradient detecting means has detected a downhill slope and the brake state detecting means has detected a change from a brake operating state to a brake non-operating state during running on the downhill slope, and for decelerating the vehicle so that an actual vehicle speed becomes the target vehicle speed.

5. The vehicular auxiliary brake control apparatus according to claim 4, further comprising an accelerator state detecting means for detecting a state of an accelerator, wherein the auxiliary brake device is activated when the accelerator state detecting means has detected a non-operating state of the accelerator.

6. A vehicular auxiliary brake control method using:

road surface gradient detecting means for estimating a vehicle weight based on driving torque and vehicle acceleration when specific behavior occurs in a vehicle, and for detecting a road surface gradient based on the estimated vehicle weight;

brake state detecting means for detecting an operation state of a brake; and vehicle speed detecting means for detecting a speed of the vehicle, the method comprising the steps of:

employing, as a target vehicle speed, a vehicle speed at a time point when the road surface gradient detecting means has detected a downhill slope and the brake state detecting means has detected a change from a brake operating state to a brake non-operating state during running on the downhill slope; and performing an auxiliary brake control by operating an auxiliary brake device for decelerating the vehicle so that an actual vehicle speed becomes the target vehicle speed.

7. The vehicular auxiliary brake control method according to claim 6, wherein the auxiliary brake control is performed when the brake state detecting means has detected that a brake non-operating state has been established after a brake operating state continued for a predetermined time.

* * * * *